No. 823,181. PATENTED JUNE 12, 1906.
C. H. LOEW.
FILTER.
APPLICATION FILED JAN. 18, 1906.

4 SHEETS—SHEET 1.

Attest:
May Hughes
Alan McDonnell.

Charles H. Loew, Inventor:
by William R. Baird
his Atty.

No. 823,181. PATENTED JUNE 12, 1906.
C. H. LOEW.
FILTER.
APPLICATION FILED JAN. 18, 1906.

4 SHEETS—SHEET 2.

Attest:
May Hughes
Alan McDonnell.

Charles H. Loew, Inventor:
by William R. Baird
his Atty.

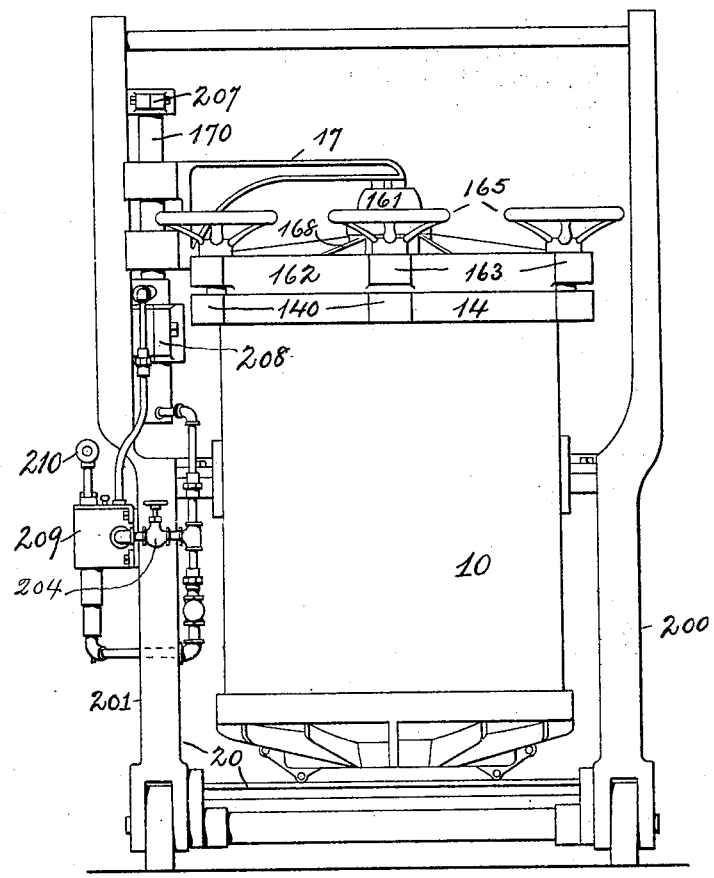

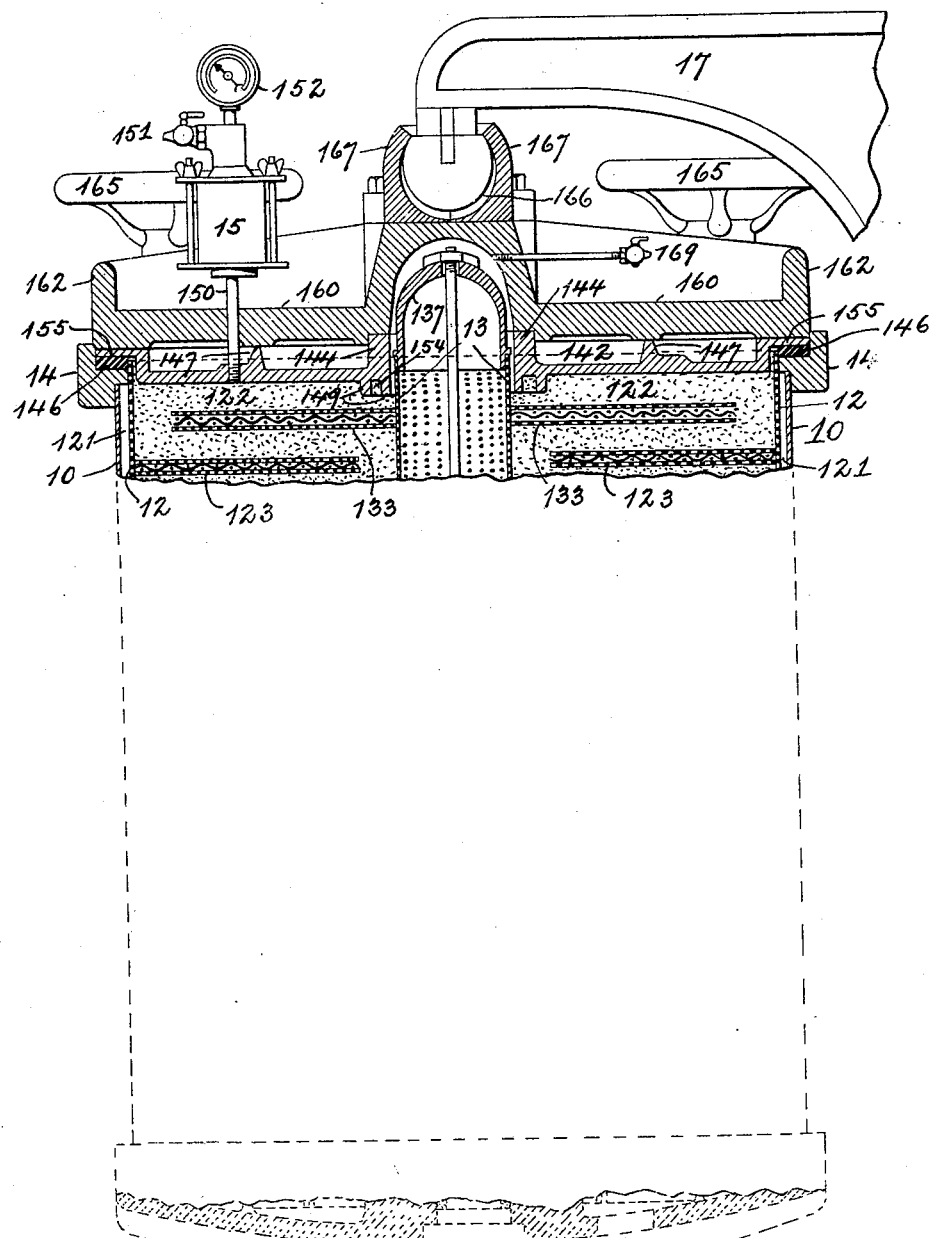

UNITED STATES PATENT OFFICE.

CHARLES H. LOEW, OF LAKEWOOD, OHIO.

FILTER.

No. 823,181.  Specification of Letters Patent.  Patented June 12, 1906.

Application filed January 18, 1906. Serial No. 296,641.

*To all whom it may concern:*

Be it known that I, CHARLES H. LOEW, a citizen of the United States, residing at Lakewood, in the county of Cuyahoga and State of Ohio, have invented certain new and useful Improvements in Filters, of which the following is a specification.

This invention relates to filters designed to be used chiefly in the clarifying of liquids having gas in solution, like beer.

By a requirement of the Patent Office this application is restricted to the cover of the filter and its adjacent parts, the other parts of the apparatus necessarily described and not claimed herein being made the subject-matter of other applications for Letters Patent.

Figure 1:
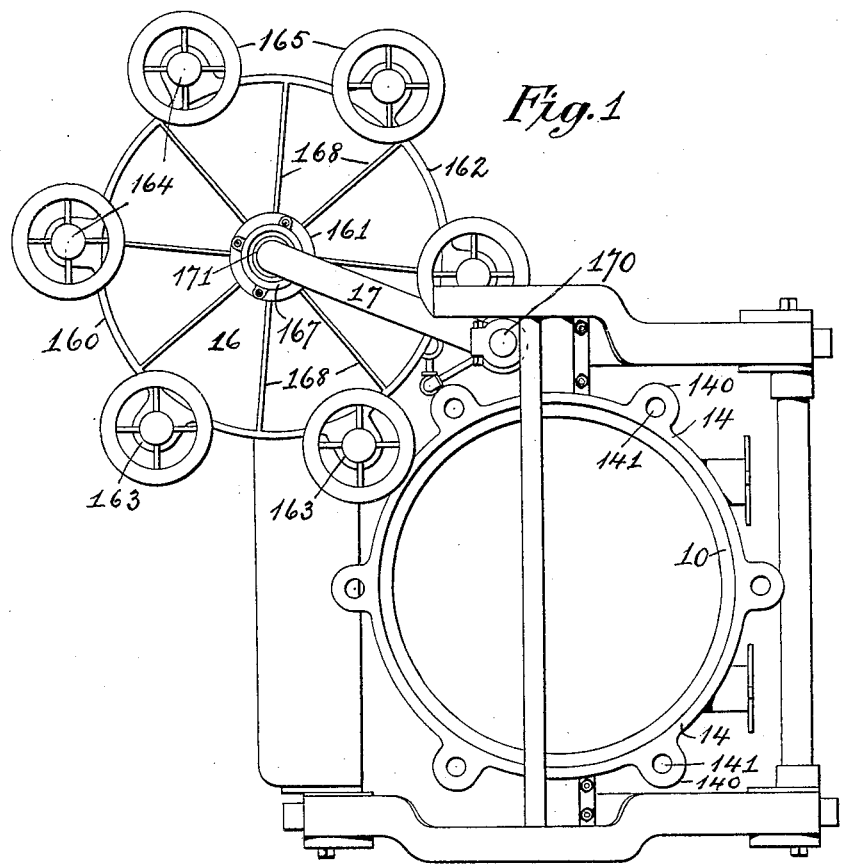
Figure 2:
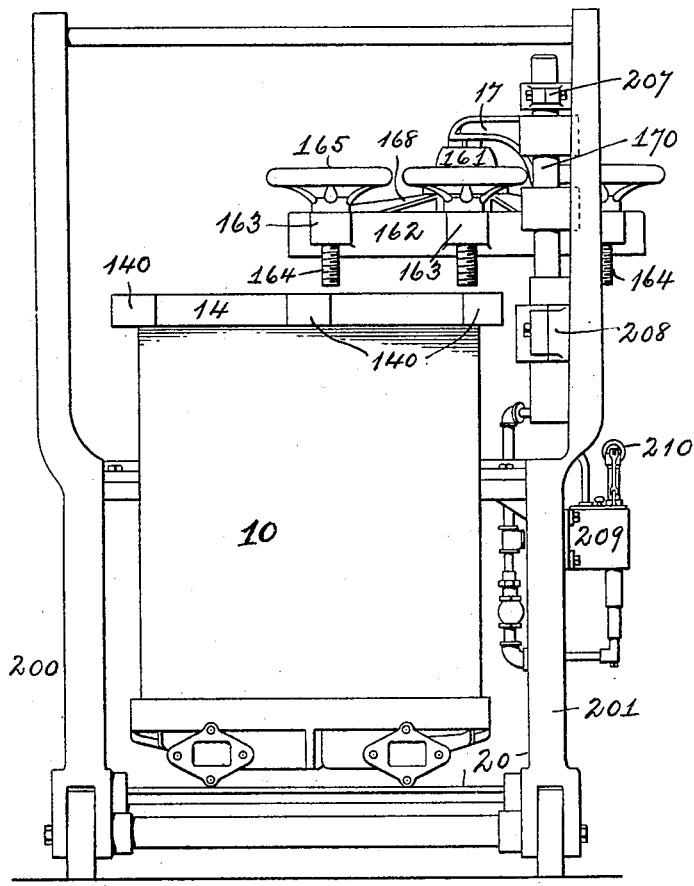

In the drawings, Figure 1 is a top plan view of the filter, showing the cover swung away from the casing and with the filter-press in a horizontal position. Fig. 2 is a front elevation showing the cover partially removed from above the casing. Fig. 3 is a rear elevation showing the cover in place on the casing. Fig. 4 is a central vertical section of the casing and cover when the latter is in place, the cover-supporting crane being broken away.

Generally speaking, the filter apparatus comprises a main frame adapted to support the filter and its appliances and connections. The filter consists of a casing, preferably cylindrical or otherwise regularly formed, containing suitable filtering elements, comprising a filtering medium, as wood-pulp, and inlet and outlet conductors, a press for squeezing the water out of the filter material, a cover for sealing the casing when it is filled with the filter elements, and sundry devices useful in manipulating the filter and its parts.

In the drawings, 10 is the casing of the filter which is preferably made of non-corrodible material, like brass, circular in cross-section, open at the top, closed at the bottom, provided with suitable inlet and outlet conduits, and including trunnions or other means by which it can be swung to move in a vertical plane.

Within the casing 10 is placed a crib 12 of woven wire, smaller in diameter than the casing, so that an annular space 121 is formed between them. At the center of the casing is placed a second crib 13, and in the space between the two cribs 12 and 13 is arranged the filtering material 122, consisting preferably of wood-pulp. Embedded in the filtering material are inlet-conductors 123, touching the outer crib 12, and outlet-conductors 133, touching the inner crib 13. These conductors each comprise a centrally-placed open-work plate made of woven wire, perforated metal, or the like, permitting the free passage of the liquid. On each side of each open-work plate there may be arranged protecting screens of fine wire or cloth.

The function of the filtering elements is to receive the beer or other liquid to be clarified from the annular space 121, into which it is introduced from the inlet-pipe at the bottom of the filter, cause it to pass through the mass of wood-pulp and leave behind it therein any mechanical impurities which it may contain in suspension, and permit its discharge through the outlet-conductors into the inner crib, whence it is drawn through the outlet-conduits of the filter.

The casing 10 has an upper rim 14 of heavy metal provided with lugs 140, having threaded eyeholes 141, adapted to receive the tightening-screws of the cover.

The top plate of the casing comprises a flat disk 142, provided with a central aperture to permit of the passage of a cap 137, forming part of the central crib. An inner annular flange 144 fits into a corresponding recess in the cover, and an outer projecting flange 155 is adapted to fit over the rim 14 and to press upon a gasket 146 to make a liquid-tight joint between the rim and the cover proper.

An intermediate annular flange 147 on the plate or disk 142 is in contact with the lower surface of the cover, and the latter is provided with an aperture to receive the stem 150 of a lantern gas-trap 15, provided with a pet-cock 151 and a low-pressure gage 152. It is also provided with two concentric depending annular flanges 149 149, between which is formed an annular groove 154.

The cover proper 16 comprises a heavy plate 160, provided with a central boss 161 and an outer upwardly-extending annular flange 162, having projections 163, adapted to support the tightening-screws 164, which are rotated by hand-wheels 165. When the cover is in place, these screws 164 register with the threaded apertures 141 in the rim 14. The boss 161 is recessed at 166 and its upper walls turned inwardly at 167, so that a ball 171 may be received therein and be seated against the inner walls thereof to form a ball-and-socket joint. The cover is also provided with radial strengthening-ribs 168. A suitable aperture permits of the passage of the stem of a try-cock 169.

The main frame 20 comprises uprights 200 and 201, connected together by suitable cross-braces and provided with rollers or casters. Flanges serve as bearings for the trunnions of the casing. The uprights are provided with cross-bars constituting bearings for the press mechanism, which forms no part of this invention and need not be further described.

The upright 201 is provided with means for supporting a hinge member 170 of a bracket 17, which supports the cover 16. These means comprise a bracket 207 to receive the upper part of the hinge member and a cylinder 208, which receives the foot of the hinge member and which foot acts as a piston within said cylinder. The cylinder is in effect the fluid-pressure cylinder of a pump 209, the actuating-handle of which is shown at 210.

The crane 17 terminates in a ball 171, which is embraced by the upper edges of the hub 167 to form a universal ball-and-socket joint therewith.

In use the filter after being cleansed is filled in the manner usual in this art. The filtering elements being placed successively within the casing and the filter-press being used to compress the upright pulp and to squeeze the water therefrom in order that a suitable density of the pulp for efficient filtration may be secured, when the last outlet-conductor has been placed in position the cap 137 is inserted above the uppermost section of the central crib and the space above the outlet-conductor having been filled with pulp and suitably compressed the upper plate 142 is placed in position, the gasket 146 having been previously inserted between it and the rim 14.

During the filling operation the cover 16 has been swung out of the way, as shown in Fig. 1. In order to place the cover in position over the casing and to secure it thereto, the crane 17 is swung inwardly until its tightening-screws register with the threaded apertures adapted to receive them in the upper rim of the casing.

It will frequently be found, however, that the crane 17 is on a plane which does not allow the cover to swing above the rim 14, and consequently it has to be raised from such plane. As stated before, the hinge member 170 constitutes, in effect, the piston of the fluid-pump. The handle 210 of the pump being operated, fluid is pumped into the cylinder 208 beneath the hinge 170 and lifts the latter gradually until the crane 17 is brought into the desired horizontal plane, when it is then swung around manually and the cover placed in proper registry with the rim.

In order to let down the cover, a valve 204, controlling a pipe leading from the cylinder beneath the hinge member 170, is opened and the fluid beneath the piston is permitted to flow from the cylinder, when of course the hinge member 170 drops and the cover drops with it. After the cover is in proper registry with the rim the tightening-screws are rotated by their hand-wheels 165, and the cover is firmly in place.

The ball-and-socket joints between the central upper member of the cover and the crane 17 is provided for the purpose of slight freedom of motion in the cover, so as to adjust it to any inequality in packing or in the pressure brought to bear upon the cover when the tightening-screws are operated.

If gas collects within the chamber, its presence will be indicated in the lantern gas-trap 15 and its pressure upon the gage 152. If the removal of such gas is sought, it may be secured by opening the cock 151 or the try-cock 169.

What I claim as new is—

1. In an apparatus of the kind described, the combination with the casing having a rim having external lugs provided with threaded eyeholes; of a cover provided with reinforcing-ribs and peripheral lugs provided with tightening-screws adapted to register and engage with the eyeholes of the casing-rim and an external support for the cover including means permitting its tilting adjustment, comprising a ball-and-socket joint intermediate the support and the cover.

2. In an apparatus of the kind described, the combination with the casing and the filter elements contained therein, of the rim of the casing, the cover therefor, and means for securing the cover to said rim, of an intermediate or false cover comprising a peripheral flange adapted to fit closely over the rim and depending annular flanges and their intermediate groove adapted to form a seal with the filter-mass.

3. In an apparatus of the kind described, the combination with the casing and the filter elements contained therein, of the rim of the casing, the cover therefor and means for securing the cover to said rim; of an intermediate or false cover comprising a central recess and a groove on its lower edge for the reception of the filter-mass to form a seal.

4. In an apparatus of the kind described, the combination with the casing and the filter elements contained therein, of the rim of the casing, the cover therefor and means for securing the cover to said rim; of an intermediate or false cover comprising a central recess, a groove on its lower edge for the reception of the filter-mass to form a seal, and an annular flange on its upper edge to contact with and support the cover.

5. In an apparatus of the kind described, the combination with the casing and the filter elements contained therein, of the rim of the casing, the cover therefor and means for securing the cover to said rim; of an intermediate or false cover comprising a central recess, a groove on its lower edge for the reception of the filter-mass to form a seal, an annular flange on its upper edge to contact with and support the cover and a peripheral flange adapted to fit closely over the rim.

6. In an apparatus of the kind described, the combination with the main frame, and the casing adapted to contain the filter elements, of a cover adapted to be firmly secured to the casing, means for swinging it in and out of registry with the casing comprising a hinge mounted on the main frame and means for raising and lowering the hinge member.

7. In an apparatus of the kind described, the combination with the main frame, and the casing adapted to contain the filter elements, of a cover adapted to be firmly secured to the casing, means for swinging it in and out of registry with the casing comprising a hinge member mounted on the main frame, means for raising and lowering the hinge member, comprising a fluid-cylinder of which the lower end of the hinge member constitutes the piston and means for introducing fluid under pressure beneath said hinge member.

8. In an apparatus of the kind described, the combination with the main frame, and the casing adapted to contain the filter elements, of a cover adapted to be firmly secured to the casing, means for swinging it in and out of registry with the casing comprising a hinge member mounted on the main frame, means for raising and lowering the hinge member, comprising a fluid-cylinder of which the lower end of the hinge member constitutes the piston and means for introducing fluid under pressure beneath said hinge member and removing it therefrom.

9. In an apparatus of the kind described, the combination with the main frame and the casing adapted to contain the filter elements, of a cover adapted to be firmly secured to the casing and means for swinging it in and out of registry with the casing, comprising a hinge member mounted on the main frame, a crane or bracket secured thereto and a flexible joint between the bracket and the cover, and means for raising and lowering the hinge member.

10. In an apparatus of the kind described, the combination with the main frame and the casing adapted to contain the filter elements, of a cover adapted to be firmly secured to the casing and means for swinging it in and out of registry with the casing, comprising a hinge member mounted on the main frame, a crane or bracket secured thereto and a flexible joint between the bracket and the cover, means for raising and lowering the hinge member, comprising a fluid-cylinder of which the lower end of the hinge member constitutes the piston and means for introducing fluid under pressure beneath said hinge member.

11. In an apparatus of the kind described, the combination with the main frame and the casing adapted to contain the filter elements, of a cover adapted to be firmly secured to the casing and means for swinging it in and out of registry with the casing, comprising a hinge member mounted on the main frame, a crane or bracket secured thereto and a flexible joint between the bracket and the cover, and means for raising and lowering the hinge member and removing it therefrom.

12. In an apparatus of the kind described, the combination with the main frame, and the casing adapted to contain the filter elements, of a cover adapted to be firmly secured to the casing, means for swinging it in and out of registry with the casing, comprising a hinge member mounted on the main frame, means for raising and lowering the hinge member and guides for the hinge member to prevent its displacement laterally.

13. In an apparatus of the kind described, the combination with the main frame, and the casing adapted to contain the filter elements, of a cover adapted to be firmly secured to the casing, means for swinging it in and out of registry with the casing, comprising a hinge member mounted on the main frame, means for raising and lowering the hinge member and guides for the hinge member to prevent its displacement laterally, consisting of brackets secured to the main frame and suitably apertured to permit of the passage of the hinge member.

14. In an apparatus of the kind described, the combination with the main frame, and the casing adapted to contain the filter elements, of a cover adapted to be firmly secured to the casing, means for swinging it in and out of registry with the casing, comprising a hinge member mounted on the main frame, means for raising and lowering the hinge member, comprising a fluid-cylinder of which the lower end of the hinge member constitutes the piston and means for introducing fluid under pressure beneath said hinge member, and guides for the hinge member to permit its displacement laterally.

15. In an apparatus of the kind described, the combination with the main frame, and the casing adapted to contain the filter elements, of a cover adapted to be firmly secured to the casing, means for swinging it in and out of registry with the casing, comprising a hinge member mounted on the main frame, means for raising and lowering the hinge member, comprising a fluid-cylinder of which the lower end of the hinge member constitutes the piston and means for introducing fluid under pressure beneath said hinge member, and guides for the hinge member to permit its displacement laterally, consisting of brackets secured to the main frame and suitably apertured to permit of the passage of the hinge member.

In testimony whereof I affix my signature in presence of two witnesses.

CHARLES H. LOEW

Witnesses:
    Wm. Raimond Baird,
    Alan McDonnell.